July 28, 1959  L. D. CRAWFORD  2,896,495
SELF-THREADING NUT
Filed March 28, 1957

LOYAL D. CRAWFORD
INVENTOR.

BY
SMITH, OLSEN, LEWIS + McRAE
ATTORNEYS

United States Patent Office 2,896,495
Patented July 28, 1959

2,896,495

SELF-THREADING NUT

Loyal D. Crawford, Ann Arbor, Mich.

Application March 28, 1957, Serial No. 649,127

1 Claim. (Cl. 85—32)

This invention relates to an improved self-threading nut of the type which will cut its own thread on unthreaded bolt stock and which after threading its way on the stud will serve in the same capacity as a common nut.

Prior to the present invention, a number of self-threading nuts or combined threading dies and nuts have been proposed. All of the prior self-threading nuts have the common feature of having only one portion of the nut being a threading die and the other portion being a common nut. It is necessary to orient all of these nuts so that the threading or die portion comes in contact with the bolt stock first, that is "leads."

The necessity for orientation has two disadvantages when such nuts are used in mass production operations. One is that they cannot be used in a hopper fed nut driving mechanism and the other is that when such nuts are placed on the work by hand, time is lost due to the necessity of orienting the nuts to the work.

There is a need for an inexpensive, small (4–7 complete threads) self-threading nut which can be applied with either end leading. None of the conventional self-threading nuts are capable of fulfilling this need because the threading die constructions could only be used in a nut of considerably more than 7 complete threads.

Therefore, it is a principal object of the present invention to provide a self-threading nut which may be driven from either end.

It is a further object of the present invention to provide a self-threading nut in which the thread forming portion consists of only the first threads at each end of the nut leaving the remainder of the threads to serve in a conventional capacity.

Another object of this invention is to provide a self-threading nut which produces a thread on unthreaded bolt stock by both cutting and swaging the metal of the bolt stock.

Still another object of the present invention is to effect clearance and disposal of the chips removed in the thread forming operations of the self-threading nut.

Another object of this invention is to provide a self-threading nut which will be self-locking.

Other objects of the invention will appear in the following description and appended claim, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompaninyg drawings, since the invention is capable of other embodiments and of being practiced or carried out in various ways. Also, it is to be understood that the phraseology or terminology employed herein is for the purpose of description and not of limitation.

Figure 1:
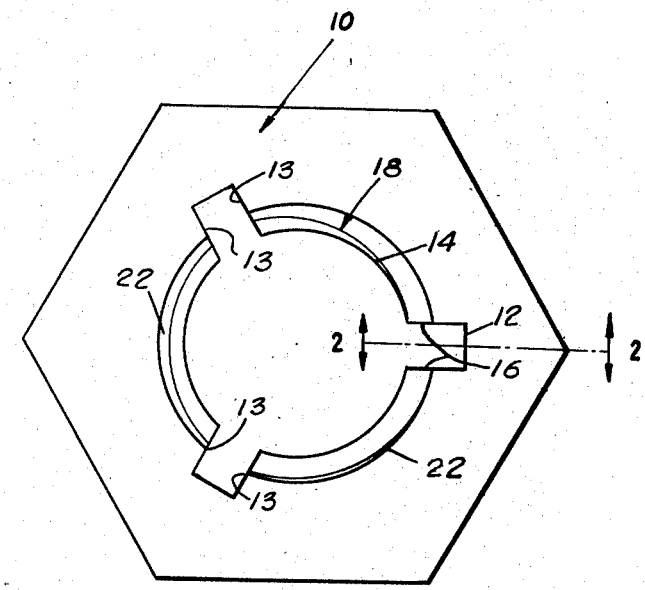
Fig. 1 is a top plan view of the self-threading nut embodying the present invention.
Figure 2:
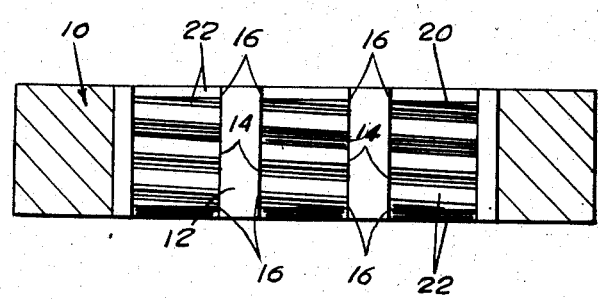
Fig. 2 is a view of the self-threading nut shown in Fig. 1, the nut being cut along the line 2—2 and opened in the direction of the arrows to lie in a straight line.

Referring now to the drawings for a more detailed description, one embodiment of the present invention can be seen. Fig. 1 shows a top plan view of the self-threading nut 10. The self-threading nut 10 has the same general form as a standard common nut and is provided with a plurality of longitudinal slots 12. The slots 12 are cut radially outwardly from the crest of the threads 14 and extend through the entire length of the nut 10 and to a depth substantially past the root diameter or base of the threads 14. There are preferably three slots 12 whose combined width equals ⅓ of the circumference of the threads 14 although more or fewer slots 12 may be used in the practice of my invention. The ⅓ ratio provides a relatively large swaging surface to the end that approximately two-thirds of the bolt threads will be formed by swaging and approximately one-third will be formed by cutting. The dual action of the nut permits threads to be formed on bolt stock with a minimal thread-forming portion provided on the nut as compared to the thread forming portion necessary on conventional threading dies which form threads almost entirely by cutting. The contour of the slots 12 is preferably rectangular as shown but may be any desired shape such as semi-circular or triangular. The number of threads provided in the nut may be varied as previously indicated, but for low cost and wide range of use, a nut having a maximum of four threads is preferred, with the first thread on each end being a tapered thread spirally driving it onto the bolt stock as shown in the drawing.

Screw thread chasing cutter faces 16 are formed by the juncture of the threads 14 and the slots 12, said slots defining side walls 13 intersecting threads 14 to form the cutter faces. Slots 12 also provide an escape for the metal chips.

Thread forming segments 18 are formed by the portions of the first of threads 14 remaining after slots 12 have been cut.

Segments 18 are tapered by chamfering both ends of nut 10 as indicated at 20 to give the nut 10 a lead over the bolt stock. The degree of inclination of the chamfer is selected in accordance with the desired length of the tapered threads. There is a maximum length of tapered thread possible with a nut of given size and a given chamfer inclination. There is a point at which the leading end of the thread will be entirely cut away as the depth of chamfer is increased. It is, in general, also desirable to have the maximum taper on the nut threads. Therefore, as large an inclination of chamfer as possible should be chosen. I have found, for instance, that for a standard ¼" common nut it is preferable to use a 90° inclined chamfer for a one thread lead and a 60° chamfer for a one and one-half thread lead.

The nut 10 is made of hardenable steel. It has been found preferable to case harden the nut to a depth of from .002 to .003 of an inch. Any conventional case hardening process may be used.

The self-threading nut 10 of the present invention both displaces and cuts metal while forming threads in bolt stock. Screw thread chasing cutter faces 16 cut an initial groove in the metal. This cut does not result in a complete thread because the leading threads are tapered. Thus each cut is followed by a swaging action accomplished by swaging surfaces 22 of thread forming segments 18.

I have found that when a nut embodying the present invention is used there is more swaging and less cutting than is the case with a conventional threading die or self-threading nut. This would not be evident from an examination of the geometry (assuming the same ratio of length of cutting segment to width of slot but a difference in the taper of the leading thread) since the ratio of cut to displaced metal would be apparently the same in either case. I believe that there is very little swaging in the conventional self-threading nut due either to the fact that there is enough clearance for the conventional cutting segment to slip by or to the elasticity of the metal of the bolt stock which may be temporarily deformed as the cutting segment passes over and then springs back to its original shape.

Due to the sharply inclined taper of the thread forming segments of the present invention, the difference in height between the leading and trailing edges is considerable. The trailing edges or thread forming segments 18 cannot slide over the groove and apparently the high stresses caused by the swaging faces 22 are above the elastic limit of the metal and permanent deformation occurs.

Whatever the reason may be for the increased swaging, I have found it does occur and in order to compensate for it the bolt stock must be of just slightly greater diameter than the pitch diameter of the threads 14. This allows space at the root of the nut threads 14 for the displaced metal of the bolt stock and completes the bolt thread.

It is desirable to tap the nut 10 with an undersize tap so that the self-threading nut 10 may be replaced by a standard common nut if desired. For example, I have found that if the nut 10 is tapped with a two flute gun tap, the tap should be .002 of an inch undersize.

The self-threading nut 10 may be manufactured with any conventional means as a nut header or in a nut die by first piercing a hole and slots, blanking out a square, hexagonal, octagonal or any desired head shape, internally screw threading the blank and chamfering the ends.

It is desirable to lubricate the nut 10 before using it in order to reduce the power necessary to drive it, to improve the quality of the threads which it cuts, and to provide a protective coating to protect the bolt from rust and corrosion. Lubrication may be effected by dipping the nut into liquid wax before storage or by applying any suitable cutting oil or compound before use. I have found also that the slots 12 may be packed with a lubricant.

While the self-threading nut of this invention is suitable for cutting threads on any bolt stock of plastic or soft metals as aluminum, brass or mild steel, or for rethreading damaged screw threads, it is particularly useful as a fastener for the studs in the assembly of small die castings. It is desirable that the bolt stock have a decreased diameter at the leading end in order to facilitate hand loading.

After the nut has been threaded on the bolt stock, it may be left on the bolt as a common nut or it may be removed and used again. If it is left on, no lock washers or locking devices are necessary as the nut has the property of being self-locking.

Having thus described my invention, I claim:

The combination comprising soft, unthreaded bolt stock and a self-threading holding nut for forming its own thread on said bolt stock; said bolt stock having a diameter greater than the pitch diameter of said nut and less than the root diameter of said nut; said nut having a maximum of four common-nut thread convolutions; a plurality of slots extending through the entire length of the nut and radially outwardly from the crest of the nut threads to a depth exceeding the base of the threads; each of said slots defining a pair of side walls which intersect the threads to form a pair of oppositely disposed thread cutting faces on each of the intersected threads; each of said cutting faces being followed by an unbroken segment of thread to form swaging surfaces to assist in the formation of threads on said bolt stock; the ratio of the width of each of said slots to the length of an adjacent unbroken segment of thread being less than 1:2 whereby there is sufficient unbroken segment of thread to hold said nut on said bolt stock after a thread has been formed thereon; and the first thread portion at each end of the nut being tapered to facilitate the formation of a thread on said bolt stock; said taper being such that the thread at each end of the nut increases to full crest height within one thread convolution whereby the nut is adapted to be driven onto said bolt stock with either end leading and whereby there are sufficient full height threads remaining on the nut to hold it in place.

References Cited in the file of this patent

UNITED STATES PATENTS

| | | |
|---|---|---|
| 451,890 | Dixon | May 5, 1891 |
| 689,555 | Mann et al. | Dec. 24, 1901 |
| 840,899 | Beck | Jan. 8, 1907 |
| 2,010,913 | Bruce et al. | Aug. 13, 1935 |
| 2,572,647 | Merwin | Oct. 23, 1951 |